(No Model.)  
C. RAUB.  
LOCOMOTIVE.  
No. 247,108.  
Patented Sept. 13, 1881.  
7 Sheets—Sheet 2.

WITNESSES:  
Carl Harz  
Otto Risch

INVENTOR  
Christian Raub  
BY Paul Goepel  
ATTORNEY (No Model.) 7 Sheets—Sheet 6.

C. RAUB.
LOCOMOTIVE.

No. 247,108. Patented Sept. 13, 1881.

WITNESSES:
Carl Kay
Otto Risch

INVENTOR
Christian Raub
BY Paul Goepel
ATTORNEY (No Model.) 7 Sheets—Sheet 7.
C. RAUB.
LOCOMOTIVE.

No. 247,108. Patented Sept. 13, 1881.

WITNESSES: INVENTOR
Carl Karp Christian Raub
Otto Risch BY Paul Goepel
ATTORNEY

UNITED STATES PATENT OFFICE.

CHRISTIAN RAUB, OF NEW YORK, N. Y.

LOCOMOTIVE.

SPECIFICATION forming part of Letters Patent No. 247,108, dated September 13, 1881.

Application filed May 25, 1881. (No model.)

*To all whom it may concern:*

Be it known that I, CHRISTIAN RAUB, of New York city, in the county and State of New York, have invented certain new and useful Improvements in Locomotives, of which the following is a specification.

It is a well-known and characteristic feature of all the types of locomotives hitherto known that, when they are suspended on four or any other even number of their driving-wheels, their heads assume a downward position, which indicates that their center of gravity is located between the head of the engine and its furthermost pair of drivers. By adding counter-weights to the rear end of the engine, so as to balance the same, it will be readily perceived that this counter-weight expresses mathematically the dead weight of the engine, which dead weight has to be moved by its motive power, and obviously involves not only a great expense in fuel, but also increased wear and tear in the machinery as well as the road. This defect is inherent in every system of locomotives hitherto devised, and it is therefore the main object of this invention to overcome and avoid this common deficiency and fault of all other locomotives by identifying, locating, and definitely securing the plane of the center of gravity with and within the vertical transverse plane of the common center of the locomotive.

My invention is designed to construct a new system of locomotives, in which the motive power is established at and within the transverse vertical plane of the center of gravity, and in which all the component parts are located and distributed equidistantly from and symmetrically to said plane of the center of gravity.

The invention consists of a locomotive the center of gravity of which is located in the vertical transverse center plane of the entire structure, and which is provided with a fire-box at each side of its transverse center plane, boilers extending longitudinally in opposite directions from the fire-boxes, and one central steam-dome vertically above and surmounting the same. The steam-dome is divided into two halves by a vertical transverse smoke-chamber, which passes intermediately between the fire-boxes and is connected with the boilers. The steam-cylinders are supported vertically one at each side of the steam-dome, their axes being in line with the transverse center plane of the locomotive. The cross-heads of the steam-cylinders are jointed by the connecting-rods to an intermediate driving-shaft, which is arranged at the lower part of the locomotive in the vertical transverse center plane of the same and coupled by driving-rods to the crank-axles of the driving-wheels, which are arranged equidistantly from and symmetrically to the transverse center plane. The water-tanks are arranged below the boilers and the coal-bunkers sidewise of and above the boilers. The ends of the boilers are supported on separate and independently-movable trucks, which, like the boilers and tanks, are arranged equidistantly from and symmetrically to the vertical transverse center plane of the locomotive. The boilers are provided with pumps worked in connection with the cross-heads of the steam-cylinders, so as to keep up the proper level of water above the flues from stroke to stroke. The remaining accessories of the locomotive are more or less the same as in the system of locomotives now in use.

In the accompanying drawings, which fully illustrate my invention, Figure 1 represents a side elevation, Fig. 2 a bottom view, partly in section, and Fig. 3 a vertical longitudinal section, of my improved locomotive. (Shown as constructed with two smoke-stacks.) Fig. 4 is a detail vertical transverse section of a boiler arranged with side smoke-chambers or flues. Fig. 5 is a detail vertical transverse section of the steam-dome, showing the supply of steam to the steam-cylinders. Fig. 12 is a side elevation of a locomotive built with three pairs of drivers; and Figs. 13, 14, and 15 are respectively a side elevation, partly in section, a vertical transverse section on line $z\ z$, Fig. 13, and a horizontal section on line $k$ $k$, Fig. 13, of a locomotive built with one central pair of drivers, to be used for elevated and narrow-gage railroads, special trains, and similar purposes.

Similar letters of reference indicate corresponding parts.

In the locomotive constructed according to the principles set forth, and to which I have given the name of the "Central Power Locomotive," the supporting-frame is of oblong shape and extended throughout the entire length and width of the locomotive, supporting a horizontal platform, which extends also around the locomotive, and which is preferably made wider in the central part of the same. The frame and platform are connected by brackets and angle-irons, so as to form really one frame, which is designated in the drawings by the letter A. This frame A is supported on symmetrically-arranged end trucks, A', and on strong elliptic or spiral springs of intermediately-arranged driving-wheels $A^2$, the driving-wheels, as well as the end trucks, being arranged equidistantly from and symmetrically to the vertical transverse center plane of the locomotive, as will be hereinafter more fully described. The middle side portions of the frame A are extended downward, each downward-extending portion being strengthened by an interior bar, $A^3$, which is riveted to the frame and placed immediately between the frame and the driving-wheels, so as to give a steady support to the axle-boxes of the drivers $A^2$.

At the lowest central part of the frame A, and as near as practicable to the rails, is arranged an intermediate transverse driving-shaft, B, which revolves in journal-boxes supported, like the axle-boxes of the drivers, by the side portions of frame A and interior bars, $A^3$. The driving-shaft B is arranged with cranks at each end, outside of the frame A, and with eccentrics inside of the frame. The axis of this intermediate driving-shaft B is in line with the vertical transverse center plane of the locomotive.

Figures 6, 8:
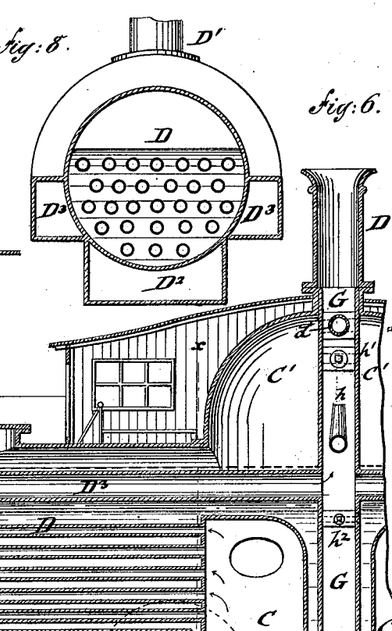
Fig. 6 is a vertical longitudinal section of a locomotive having a transverse smoke-chamber and one central smoke-stack.
Figs. 8 and 9 show vertical transverse sections of modified constructions of the boilers.

The frame and platform A support, in a middle open space, two transverse fire-boxes, C, which are equidistant from and symmetrical to the transverse center plane, and separated either by a water-chamber, as in Fig. 3, or by a transverse smoke-chamber, to be more fully described hereinafter. The fire-boxes extend above and below the platform, and are each provided with fire-doors, one at each side. The fire can thereby be kept up from both sides, the heat from the fire serving to heat the water in two tubular, cellular, or other boilers, D, which extend longitudinally and in opposite directions from the central fire-boxes, C C, to the full length of the frame A. The fire-gases are drawn through the tubes of the boilers to the smoke-chambers at the ends of the boilers, and from these smoke-chambers they are drawn either through the return-flues $D^3$ in the boilers, as shown in Fig. 6, to a central vertical transverse smoke-chamber, G, having a single smoke-stack, D', or through side flues or chambers, $D^3$, extending along the outside of the boilers, to collecting smoke-chambers $D^4$ and separate smoke-stacks D', as shown in Figs. 3 and 4.

Vertically above the fire-boxes and the inner tops of the boilers is arranged a steam-dome, C', which forms the center of the locomotive both in longitudinal and lateral directions, the axis of the dome being the center of the entire locomotive. This steam-dome is stiffened, whenever the locomotive is designed for high speed or heavy freight, by the transverse smoke-chamber G, which, however, in locomotives of lighter construction, may be dispensed with. The transverse smoke-chamber G is heated up by the gases of combustion passing through it to the smoke-stack, and serves thereby to superheat the steam, so that not only dry steam but steam of high pressure is obtained.

Figures 3, 4, 5:
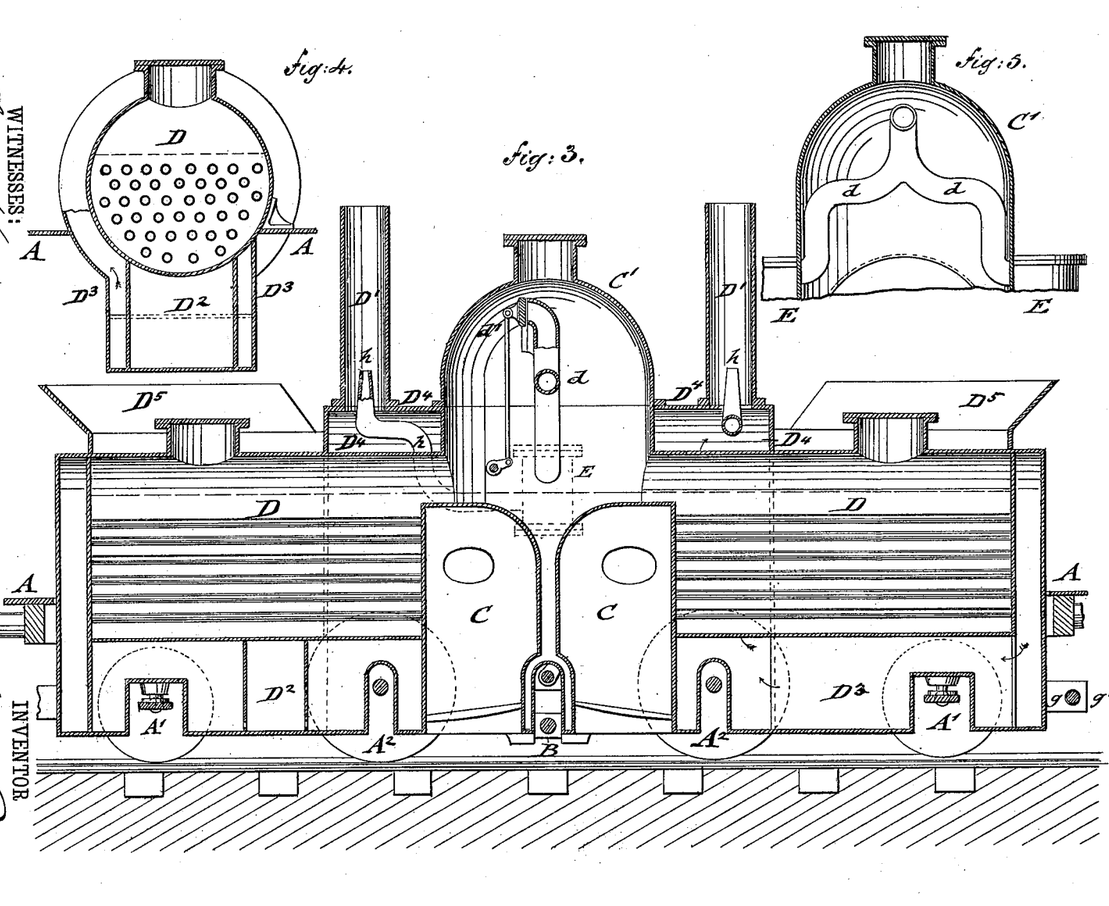
Figures 7, 10, 11:
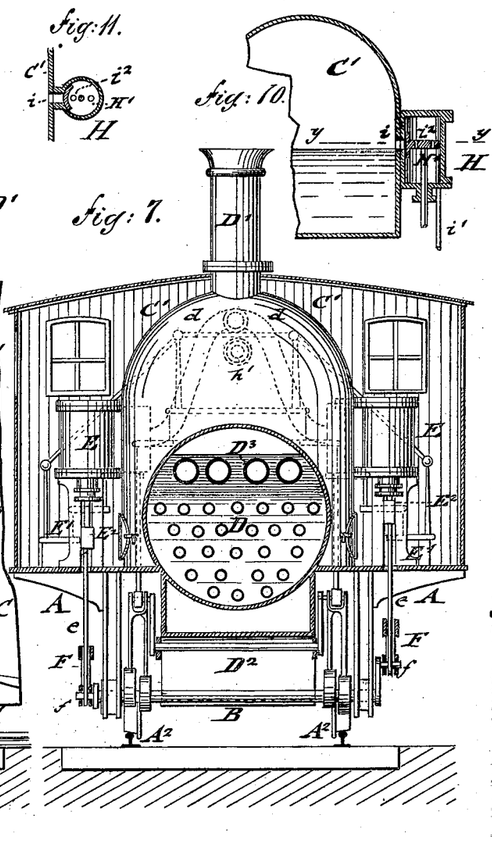
Fig. 7 is a vertical transverse section of the locomotive on line $x\ x$, Fig. 6.
Figs. 10 and 11 are respectively a detail vertical central and a horizontal section on line $y\ y$, Fig. 10, of the water-supplying-pump mechanism.

At each side of the steam-dome C' is arranged a vertical steam-cylinder, E, the axis of which is in line with the vertical transverse center plane of the locomotive, the cylinders being supported on suitable standards, E', of frame A, and preferably placed as high as possible, so as to take up the steam directly from the highest practical point of the dome by means of pipes $d$, which receive their steam-supply from a common opening at the highest point of the steam-dome, the opening being closed by a throttle-valve, d', operated by a lever or other mechanism from the outside in the usual manner, as shown clearly in Figs. 3, 5, and 7. Owing to the position of the steam-cylinders E E the steam is almost directly conducted to and taken up by the same, so as to be used in a dry and superheated state with but little condensation, which forms an essential advantage in the economical working of my system of locomotives.

The cross-heads $E^2$ of the piston-rods of the steam-cylinders are guided by the supporting-standards E' of the steam-cylinders E, and coupled by the connecting-rods $e$ to the cranks of the intermediate driving-shaft B. The wrist-pins of the cranks of this driving-shaft B are pivoted to central points of horizontal driving-rods F, one at each side of the locomotive, the driving-rods being again coupled at their ends to the cranks of the driving-wheels $A^2$. The cranks of the shaft C and of the driving-wheels $A^2$, at one side of the locomotive, are placed in the usual manner at right angles to those at the other side of the same, so as to overcome the dead-points. The cranks of the intermediate driving-shaft B are parallel to the cranks of the driving-wheels and in one vertical plane with the pivot of the cross-heads and connecting-rods.

Owing to the fact that the dead-points of the cranks of the drivers are in a horizontal line at each side of the axles, while the dead-points of the cranks of the intermediate driving-shaft B are vertically above and below the shaft, and consequently at right angles to the line of the dead-points of the drivers, it is obvious that when the cranks of the drivers are at their dead-points they are carried over the same by the momentum of the cranks of the intermediate driving-shaft, which are then at their points of greatest force, while, when the cranks of the intermediate driving-shaft are at their dead-points, they are carried over the same by the momentum of the drivers. Consequently, by the relative positions of the three cranks and their connection by the driving-rods the dead-points of the driving crank-shaft B and of the crank-axles of the drivers are overcome, and thus by the alternate action of the motive gear at opposite sides of the locomotive a steady and continuous motion of the same is secured without side strain upon the rails.

In case more than two pairs of drivers are desired for getting extra power and speed a third pair may be interposed, the axle of which is located in the transverse center plane and takes the place of the driving-shaft B, while the cranks are directly coupled to the connecting-rods $e$ and driving-rods F, as shown in Fig. 12. When four pairs of drivers are desired they are arranged symmetrically to the center plane, two pairs at each side thereof, and coupled to an intermediate driving-shaft, as in the case of two pairs first described.

The driving-rods F have to be slotted at their middle portions, so as to provide a space for the passage and free motion of the connecting-rods without interfering therewith. The play of the connecting-rods is that of a pendulum which swings on a shifting pivot, said pivot being in the cross-head, while the cranks at the lower ends correspond to the weight of the pendulum. The driving-rods F are extended downward to the cranks of the driving-shaft B by means of straight or arc-shaped pieces $f$, which establish the connection between the cranks of the lower driving-shaft, B, and the crank-axles of the driving-wheels $A^2$.

Figure 14:
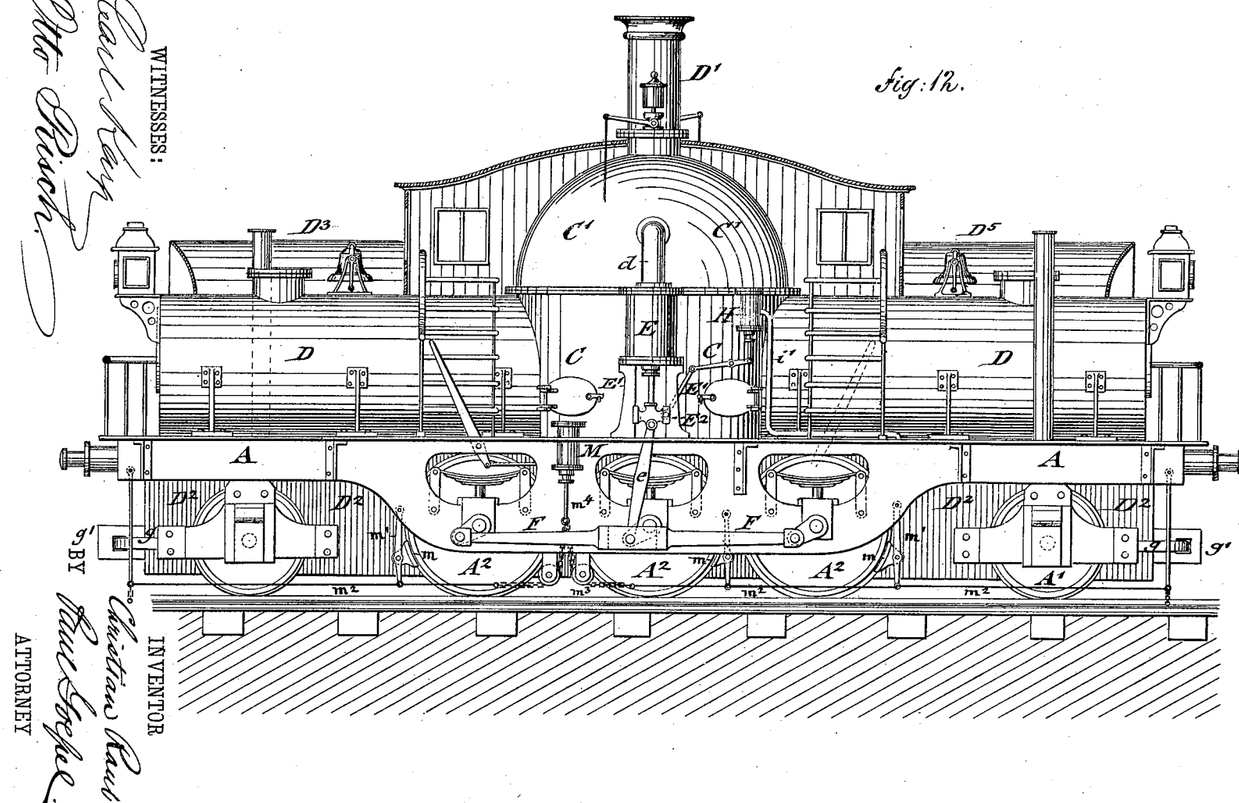
Figure 15:
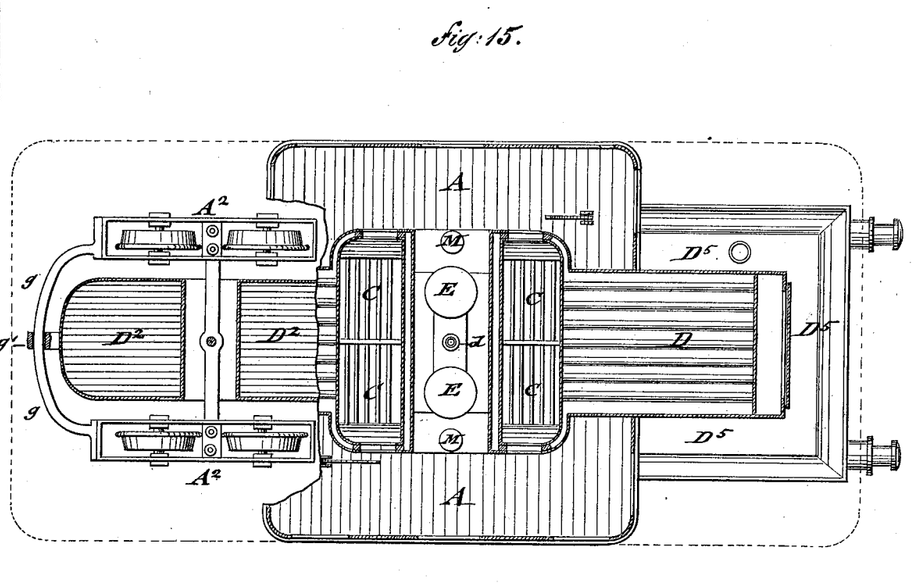

The number of driving-wheels is determined by the weight of the locomotive and by the speed for which it is designed. If the engine shall have an uneven number of pairs of driving-wheels, one of them forms a center pair in place of the intermediate driving-shaft, as shown in Fig. 12, while with an even number of driving-wheels the intermediate shaft has to be employed. The engine may, however, have such a number of drivers as to dispense with the use of trucks. For some purposes it may be desirable to construct the engine with one pair of drivers only, as for elevated roads, narrow-gage roads, for mail and special trains, and the like. In this case the steam-cylinders are arranged at the inside of an open or transverse space that is arranged centrally between the fire-boxes and extended upward through the dome, being arched at the top, as shown clearly in Figs. 13, 14, and 15. The intermediate driving-shaft, B, is in this case dispensed with, and the connecting-rods of the steam-cylinders are coupled directly to the cranks of the axle of the driving-wheels. The steam-cylinders E are connected by their steam-chests and supported on a common transverse frame, E', as shown in Fig. 14.

Owing to the disposition of the motive power at the center of the locomotive, the eccentrics are removed from the axles of the driving-wheels and placed upon the intermediate driving-shaft, B, while the link-motions are arranged on an auxiliary shaft vertically above the same. The link-motions are connected directly with the slide-valves of the steam-cylinders E, the steam-chests of which are either inside of the steam-dome or with their inner faces in contact therewith, so as to be entirely protected against loss of heat by radiation, the steam-chests receiving steam directly from the top of the steam-dome in its hottest and driest state, so that but a minimum of condensation can take place.

In the locomotives heretofore in use the main weight rests upon the front truck, which is connected with the frame by a king-bolt and turn-table. In place of the same, two trucks, one at each end of the frame, are used, which are, however, not intended to support any extra weight, but simply to guide the engine. Each end truck, A', has one or more transverse axles with one or more pairs of wheels, and a frame which incloses the wheels, and is connected by an arc-shaped guide-piece, $g$, which is transversely guided in a fixed center box, $g'$, at the end of the locomotive. The main frame A rests upon spring-cushioned anti-friction segments or rollers $a$, the springs of which are applied to the pedestals of the wheel-frames. The two pedestals and the guide-piece form three points of bearings, all of which have free play, so that the end trucks pass readily around curves. The arc-shaped guide-piece $g$ may be repeated symmetrically at the inner sides of the trucks and guided in fixed center boxes, if such be desired, to give greater steadiness to the trucks.

Below the boilers and extending throughout the full length of the same are arranged the water-tanks $D^2$, which are properly connected with the frame A, the fire-boxes, and the boilers. They are divided by vertical transverse partitions into a number of sections, that communicate with each other by slots or openings at the lower part of the partitions, so as to confine the shifting of the water-level to each section and prevent any detrimental influence of the change of water-level upon the engine in ascending and descending gradients.

Above and sidewise of the boilers D are arranged the storage-places or bunkers $D^5$ for the fuel, so that thereby both boilers are fully inclosed and protected against radiation, while the water in the water-tanks is furthermore heated up preparatory to being pumped, partly by the proximity of the tanks to the boilers, and also by the outer return-flues, if such are employed, as shown in Figs. 3 and 4.

Should any one of the boilers by some accident become useless, the other will always be capable of propelling the engine and train without necessitating the stoppage of the same. When interior return-flues are used they are made of larger diameter than the heating-tubes, so as to keep up a good draft therein, the return-flues opening into the transfer smoke-chamber G, which is arranged with a draft-nozzle, $h$, above the return-flues, so that any desired degree of draft may be kept up. The lower part of the smoke-chamber G is extended downward, so as to separate the fire-boxes C C from each other, the walls of the smoke-chamber G forming, with the downwardly-extended crown-sheets of the fire-boxes, separate water-chambers for the better utilization of the fuel in the fire-boxes. The soot and ashes settling in the lower part of the central smoke-chamber, G, may be removed from time to time by means of a trap-door at the bottom of the chamber, or by blowing steam through the same.

Figure 1:
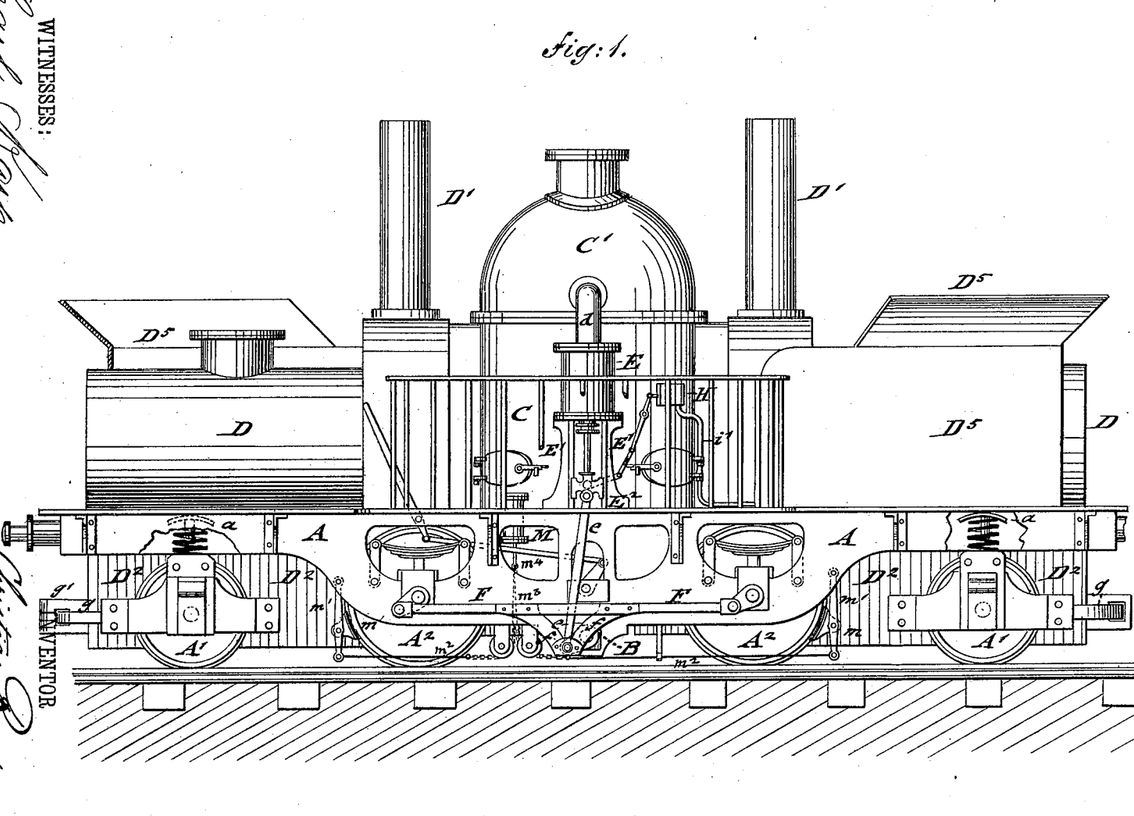
Figure 2:
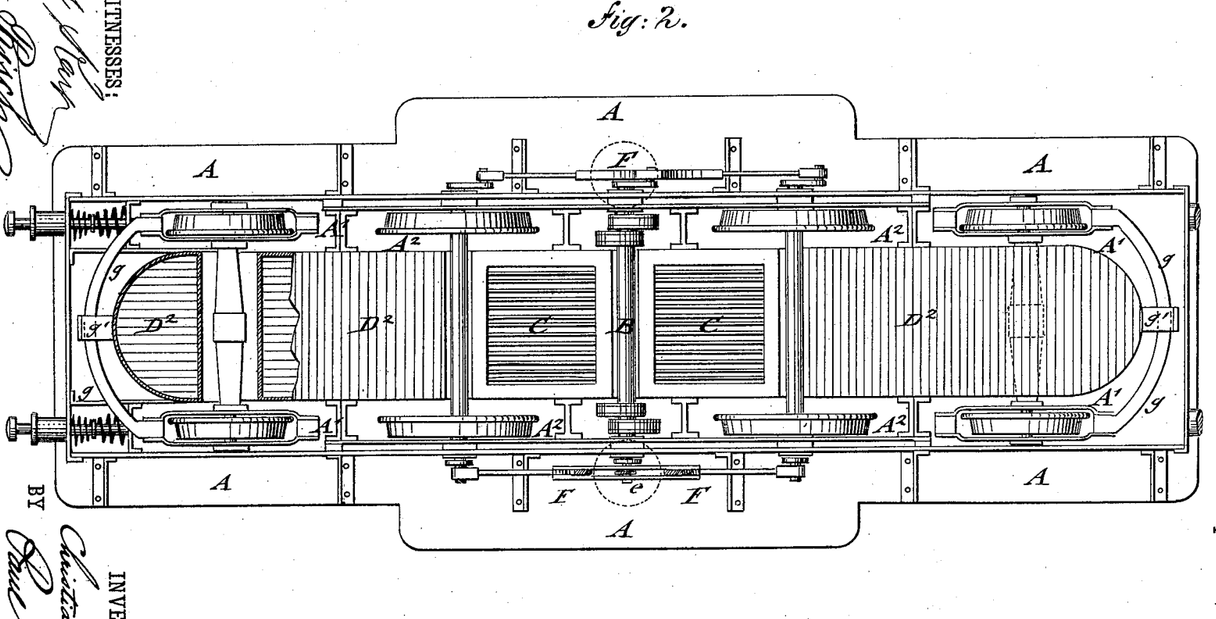

Above the draft-nozzle $h$ is arranged a valved communicating-pipe, $h'$, by which steam may be admitted from one boiler to the other or the communication between the boilers interrupted, so as to confine the steam within each boiler when one only is desired to be used. In similar manner a second valved tube, $h^2$, is arranged below the draft-nozzle $h$ for establishing or interrupting the water-communication of the boilers, as shown in Fig. 1. As the smoke-chamber G extends through the dome and is rigidly connected therewith, it serves as a strong transverse brace-frame to the casing of the fire-boxes and steam-dome, so as to stiffen it and render it more capable of resisting the strain and pressure exerted thereon by the motive power. The throttle-valve is also arranged in the smoke-chamber above the communicating-pipe $h'$, the pipes $d$ passing through the smoke-chamber to the steam-cylinders E, which exposes the steam to the action of the heat in the smoke-chambers and prevents condensation. If the return-flues of the boilers are arranged in the form of exterior chambers on both sides of the boiler and water-tanks, as shown in Figs. 3, 4, and 8, the products of combustion are passed along both sides of the boiler and water-tanks, which has the advantage of heating up the water in the boiler and tanks.

Figure 9:
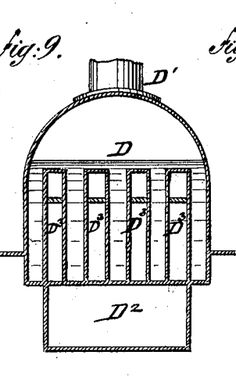

In Figs. 8 and 9 modified constructions of the boilers are shown, one with side return-chambers and the other with cellular return-flues.

In order to keep up the proper water-level above the flues and dispense with any loss of steam by condensation incidental to the irregular supply of cold feed-water, an automatically-acting pump, H, is arranged in connection with each boiler at each side of the casing of the dome, said pumps being worked by lever-connections with the cross-heads of the pistons, so as to throw at each stroke of the pistons a small quantity of water, equivalent to the amount of steam used for each stroke, into the boilers. The feed-water is forced by the pump H through an opening, $i$, in the exterior casing of the steam-dome to the inside of the boiler, the upper edge of the opening being exactly on a level with the water-line. The piston H' of the pump H has one or more perforations, $i^2$, and also an enlarged side face, which passes over the opening $i$ by the motion of the piston, so as to open or close the same. A pipe, $i'$, extends from the pump H down into the water-tank $D^2$ below the boiler. If the water-line begins to sink below the upper edge of the admission-opening $i$, steam will enter at the downstroke of the piston into the upper section of the pump-casing, where it becomes condensed by the lower temperature therein, so as to form a partial vacuum, which causes the water to be drawn up through the pipe $i'$ into the pump-casing, where it passes through the piston and is forced into the boiler. The construction of the pump is clearly shown in detail in Figs. 10 and 11.

The lever-connection of the piston-rod of the pump-casing with the cross-head $E^2$ of the steam-cylinder E may be readily disconnected and the lever worked by hand, so that the boiler can be supplied with water even when the locomotive is not in motion, as when stopping at stations. The continuous action of the pumps H during the motion of the locomotive secures a uniform water-level in the boilers and avoids any danger of explosion, as it makes the water-supply independent of the attendant.

In place of disconnecting the pumps from the cross-heads at stations, an injector can be arranged in addition to the pumps, so as to force in the water at any time.

The water in the water-tanks is replenished at the water-stations by means of stand-pipes, which pass upward from the tanks and sidewise of the boilers, sufficiently above the same to be readily connected with the supply-pipe of the water-station.

Each driving-wheel $A^2$ is arranged with a brake, the shoe $m$ of which is hinged sidewise to the lower part of the water-tank, and applied rigidly to a pendent rod, $m'$, of the main frame A. To the lower end of the pendent brake-rod $m'$ is pivoted a horizontally-guided rod, $m^2$, that is connected with a chain, $m^3$, passing over a fixed guide-roller, $m^4$, to the piston-rod of a small brake-cylinder, M, supported on frame A. When steam is admitted into the brake-cylinder the piston is raised and the brakes are applied. As soon as the supply of steam is interrupted the piston descends and the brakes are dropped from the driving-wheels by their own weight.

The brake-shoes at each side of the locomotive may be operated jointly or separately by arranging a brake-cylinder for each shoe.

By arranging similar brake-shoes on all the cars of the train, and coupling the horizontal brake-rods of the locomotive, the brakes of the entire train may be applied or released by the brake-cylinder M of the locomotive, which is more economical than the air or vacuum brakes heretofore used on each car, especially as it permits the entire train to be speedily stopped without the shocks or jerks, on the principle of contracting the whole train into one connected body, instead of dividing its parts into separate bodies. As soon as the brake-cylinders are started the brakes of all the cars are applied, and the train is drawn together and finally stopped without any backing of the engine.

At both sides of the locomotive is arranged a lever mechanism, which is connected with the link-motions above the intermediate driving-shaft, B, so as to start, stop, and reverse the engine at will.

Instead of arranging the cab at the rear end of the locomotive, as heretofore, it is arranged at the center around the casing of the fire-boxes and steam-dome, sufficient room being provided for the engineer and fireman, the communication from one side of the engine to the other being established by means of steps over each boiler, as shown clearly in Figs. 6, 7, and 12.

The cab is provided with windows in its end and side walls, so as to admit of a convenient lookout, whatever be the direction in which the locomotive is running.

The remaining accessories—such as water and pressure gages, signalling devices, and the like—are the same as in the locomotives heretofore in use.

The system of central power locomotives furnishes the following advantages: First, simplicity of construction, owing to the fact that the fire-chambers, boilers, and the steam-dome form one connected body, which is supported on the platform and may be lifted therefrom separately, leaving the water-tanks and frame independent therefrom and from the driving-wheels and supporting end trucks; second, a perfect balance of the entire structure, as all the parts are arranged symmetrically to the longitudinal and transverse axial plane, and the motive power established in line with the vertical plane of the center of gravity, so as to dispense with all dead weights; third, a separate tender is not required by my system, as the same is embodied in the locomotive respectively above and below the boilers; fourth, turn-tables are not necessary for my locomotives, as they can be run in either direction with equal efficacy and without any damaging effect to the gearing; fifth, perfect safety in running at any speed, owing to the balanced position of the driving-wheels toward the plane of the center of gravity, by which the disturbing influence of the centrifugal power of the drivers upon the motion of the locomotive is neutralized, so that there is less danger of breaking the driving-rods, and less tension upon the track; sixth, economy in running, as the steam is utilized without loss by condensation, a more perfect combustion and utilization of the fuel obtained, and by the regular supply of feed-water sudden condensation of steam in the steam-dome prevented; seventh, an accident to one of the boilers will not cause the total breaking down of the engine, inasmuch as the communication between the boilers can be closed, and the remaining boiler will be sufficient to propel the engine; eighth, owing to the central arrangement of the motive power and the balancing of all parts of the engine, there is less strain on the motive gear, less wear and liability to repairs, and consequently a longer duration of the locomotive; ninth, as the locomotive carries no dead weights, nor the drivers balance-weights, its entire capacity can be utilized for obtaining speed or for moving weight.

Having thus described my invention, I claim as new and desire to secure by Letters Patent—

1. A locomotive in which the motive power is established at and within the vertical transverse plane of the center of gravity of the entire structure, and in which the component parts are located and distributed symmetrically to said plane of the center of gravity, substantially as set forth.

2. A locomotive the fire-boxes of which are arranged symmetrically to the vertical transverse center plane, and divided by a vertical transverse smoke-chamber passing through the steam-dome above the fire-boxes, arranged substantially as described.

3. A locomotive in which the axes of the steam-cylinders are placed in the vertical transverse center plane of the entire structure, as specified.

4. A locomotive having central fire-boxes, a steam-dome vertically above the same, boilers extending longitudinally from the fire-boxes, and vertical steam-cylinders arranged symmetrically at each side of the steam-dome, the axes of the steam-cylinders being in line with a transverse plane passing through the central axis of the entire structure, substantially as specified.

5. A locomotive having central fire-boxes, a steam-dome vertically above the same, boilers extending longitudinally from the fire-boxes, centrally-located water-tanks below the boilers, and fuel-storage receptacles sidewise and above the same, substantially as set forth.

6. In a locomotive, the combination of steam-cylinders arranged at each side of a central steam-dome, and an intermediate driving-shaft arranged below the steam-cylinders, with driving-wheels arranged symmetrically to the transverse plane of the steam-cylinders, and driving-rods connecting the cranks of the driving-shaft with the cranks of the driving-wheels, substantially as and for the purpose set forth.

7. As an improvement in locomotives, the combination of central fire-boxes, a steam-dome vertically above the same, longitudinal boilers extending from the fire-boxes, steam-cylinders at each side of the dome, driving-wheels arranged symmetrically to the vertical transverse center plane of the engine, and mechanism, substantially as described, whereby the power of the steam-cylinders is transmitted to the driving-wheels, so as to overcome the dead-points of the same, substantially as set forth.

8. In a locomotive, the combination of a steam-dome arranged vertically above the fire-boxes and boilers, extending symmetrically at both sides therefrom, with a transverse smoke-chamber having valved water and steam connections, whereby communication between the boilers can be established or interrupted, substantially as specified.

9. The combination, with a locomotive constructed substantially as described, of a supporting main frame and end trucks having spring-cushioned anti-friction plates or rollers supported upon the pedestals of the trucks, substantially as described.

10. The combination of a locomotive, substantially as described, with end trucks, A', having arc-shaped guide-pieces $g$, and with fixed central guide-boxes, $g'$, at the ends of the locomotive, substantially as specified.

11. In a locomotive, the combination, with the boilers and steam-dome, of a valved supply-opening above the water-level, and of a steam-pump operated by lever-connection with the cross-heads of the main steam-cylinders, so as to supply the boilers at each stroke of the main pistons with water equivalent to the steam used for each stroke, as described.

In testimony that I claim the foregoing as my invention I have signed my name, in presence of two witnesses, this 13th day of April, 1881.

CHRISTIAN RAUB.

Witnesses:
PAUL GOEPEL,
CARL KARP.